United States Patent [19]

Wallace

[11] Patent Number: 4,545,712
[45] Date of Patent: Oct. 8, 1985

[54] THREAD LOCK

[75] Inventor: Richard B. Wallace, Bloomfield Hills, Mich.

[73] Assignee: The Oakland Corporation, Troy, Mich.

[21] Appl. No.: 521,972

[22] Filed: Aug. 11, 1983

[51] Int. Cl.$^4$ .............................................. F16B 39/02
[52] U.S. Cl. ................................... 411/258; 411/302; 411/930; 10/10 P
[58] Field of Search ................. 411/82, 258, 301, 302, 411/903, 908, 930; 10/10 P; 427/180, 202, 337, 402, 409, 410; 118/DIGS. 1–5

[56] References Cited

U.S. PATENT DOCUMENTS

| | | | |
|---|---|---|---|
| 2,939,805 | 6/1960 | Johnson | 411/258 |
| 3,061,455 | 10/1962 | Anthony | 411/258 |
| 4,059,136 | 11/1977 | Wallace | 411/258 |
| 4,081,012 | 3/1978 | Wallace | 411/258 |
| 4,428,982 | 1/1984 | Wallace | 411/258 |

Primary Examiner—Gary L. Smith
Assistant Examiner—Neill Wilson
Attorney, Agent, or Firm—Barnes, Kisselle, Raisch, Choate, Whittemore & Hulbert

[57] ABSTRACT

A threaded fastener having a deposit of a fluid polymerizable resin in the bottoms of the thread grooves, a fluid polymerizing agent overlying the resin in the thread grooves, and a strong non-tacky protective film covering the agent. The fluid resin and agent have therebetween a barrier film as a result of polymerization of the resin where it contacts the polymerizing agent. Preferably, the fluid resin and agent deposit includes abrasive particles, such as table salt to enhance mixing when the fastener engages a mating threaded member. In production, the protective film is applied as an aqueous solution of PVA, which is rapidly converted to the non-tacky film by the application of a desiccant powder such as a derivative of guar gum.

8 Claims, 5 Drawing Figures

THREAD LOCK

BACKGROUND AND SUMMARY OF THE INVENTION

This invention is an improvement over my prior U.S. Pat. No. 4,081,012, and over Johnson Pat. No. 2,939,805.

In my prior patent, there is disclosed a threaded fastener having fluid, unreacted epoxy resin deposited within thread grooves thereof extending only part way around the fastener, and a fluid activating or polymerizing agent deposited within the thread grooves directly adjacent the epoxy deposit. These two fluid deposits flow together, and where they abut, they react to form a solid barrier film which prevents further reaction until the two fluid materials are intermixed by threading together two mating threaded fasteners, one of which is modified as described above.

The prior patent discloses the use of a protective, non-tacky cover film overlying the deposits of fluid epoxy and activator, which is preferably polyvinyl alcohol (PVA), and is applied in an aqueous solution as a spray.

Johnson U.S. Pat. No. 2,939,805 discloses and claims a self locking bolt, two component fastening elements having ". . . mutually engageable surfaces . . . " (the threads) and ". . . two discrete mutually polymerizable coatings between said surfaces adapted to be . . . mixed together during engagement of said surfaces to form a polymerized mass effectively locking said surfaces . . . ".

The coatings may be deposited by "spraying, dipping and the like" and "are adapted to form a polymerized mixture and when mixed, preferably form a metal-to-metal adhesive."

The patent sets out two Examples. In Example 1, an epoxy resin is "heated to a liquid form and a threaded bolt shank is dipped into it to form a single coating." The second superimposed coating is applied only after the liquid epoxy coating has cooled, which is understood to mean that it is changed from its liquid condition to which it was heated to a solid. The second coating is applied by dipping into a solution of a polyamide in methyl isobutyl carbinol.

The patent states that a polymeric membrane was substantially immediately formed between the two coatings because they are "mutually reactive".

Evidently Johnson's product is completed by evaporation of the solvent, since there is no suggestion that either coating, the epoxy resin or the polyamide solution remain fluid. More significant is the fact that Johnson provides no protective cover material over the coatings.

In his second Example, Johnson teaches forming a 70% solids solution of a product formed by reacting 5 mols of totylene diisocyanate with 1 mol of trimethylol propane and 1 mol of 1, 4 hexane diol. The bolt is dipped in this solution and "allowed to dry." The second coating is applied by dipping the bolt in a specific alkyd resin. There is no suggestion that the alkyd resin remains fluid, and the absence of any protective cover indicates that neither of the coating remains fluid or are designed for immediate use.

In my prior U.S. Pat. No. 4,081,012, I have disclosed the deposit of a fluid epoxy resin and a fluid activator circumferentially in contiguous areas. Where these materials come into contact with each other, there is formed a barrier film which prevents intermixture of these deposits until the fasteners are brought together. To protect these deposits, at least one of which remains fluid, a thin protective cover film, specifically PVA, is applied.

In accordance with the present invention, a new product in the form of a threaded fastener having in an annular zone extending completely around the fastener, superimposed deposits both of which also extend completely around the fastener and which react to form an annular barrier film extending between the deposits to prevent intermixture thereof. The deposits, which remain fluid, have a non-tacky protective cover film over the deposits.

The production of these fateners is accomplished on a single, short production line, in which a succession of bolts are advanced on a conveyor through stations which apply a deposit of at least partly unreacted fluid epoxy resin, a deposit of fluid activator, a deposit of a film-forming aqueous solution of protective material such as PVA, and an application of a quick drying powder such as guar to the film forming material.

DETAILED DESCRIPTION

The present invention provides a fully automatic, high production, inexpensive method of producing threaded fasteners provided with locking means activated only by threaded engagement with a mating fastener, and a novel fastener produced by the method.

Figure 1:
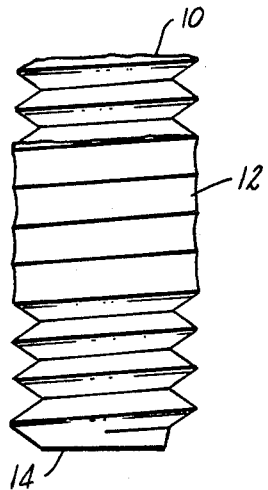
FIG. 1 is a fragmentary elevation of a fastener in accordance with the present invention.

The fastener, herein illustrated as a male fastener element or bolt 10, a portion of which is illustrated in FIG. 1, has on an intermediate portion thereof, a complete annular ring or band 12 in which locking material is deposited within the thread grooves. The band 12 is spaced from the entering end 14 of the fastener, to facilitate initiation of threaded engagement with a mating fastener element.

Figure 2:
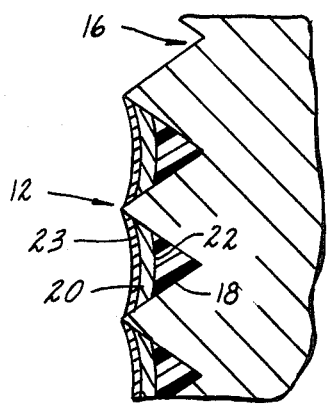
FIG. 2 is an enlarged sectional view of a portion of a thread.

Within the band or ring 12, as best seen in the enlarged sectional view of FIG. 2, there is deposited within the bottom of the thread grooves 16 a fluid polymerizable resin 18. A preferred resin for this purpose is an epoxy resin which is deposited and which remains in a fluid condition until it is polymerized as will be subsequently described. As seen in this Figure, the deposit 18 extends along the sides of the thread grooves nearly or completely to the top thereof, but is supplied in such an amount that it does not fill the groove. Its outer surface assumes the concave curvature illustrated.

Overlying the resin completely around the fastener is a continuous layer 20 of an activator to effect polymerization of the resin, when mixed therewith. The layer 20, as will later be described, is applied in such a way that it does not mix with the resin. However, where the inner surface of the layer 20 comes into contact with the outer surface of the resin deposit, there is an immediate interaction which produces a barrier film. The barrier film prevents or limits the interaction, so that there is provided a still fluid resin deposit 18, a solid barrier film indicated by the line 22, and a still fluid, relatively thin layer 20 of the activator or polymerization agent.

The quantity of polymerizable resin and activator is preferably such that together they substantially fill the thread groove as seen in FIG. 2, but leave the material as so far deposited wholly within the thread groove as illustrated.

The fastener is then provided with a thin coating of a protective film-forming material which preferably is an aqueous solution of polyvinyl alcohol. In order to expedite formation of the film 23, the exposed PVA solution is subjected to a spray of powdered desiccant which extracts water from the PVA solution, providing some interim strength to the film and supplying partial protection to the resin and activator deposits while final drying proceeds.

Excellent results have been obtained in commercial production when the powdered desiccant is a derivative of guar gum identified by the supplier (Celanese Plastics and Specialties Co., Louisville, Ky.) as HP-11.

Evidently the powder remains in expanded but still granular form and has the effect of forming a rough exposed surface for the bonding material. This has a practical advantage in that it facilitates break-up of the PVA film when threaded fasteners are engaged, and assists in mixing the resin and hardener.

It is usual for the customer to specify a minimum torque required to separate threaded fasteners locked or bonded together by the bonding material. In some cases the specified break-away torque is at a value which in the past has been difficult to achieve. It has been found that the inclusion, usually in the resin, of hard abrasive particles, increases the effectiveness of the locking action so that even exceptionally high torque requirements are easily surpassed. The addition of ordinary table salt crystals has proved entirely satisfactory. The exact co-action of the salt crystals in the combination disclosed is not clear, but it is assumed that the improved results are attributable to a scouring of the fluid resin from the threaded surfaces and a better and more intimate mixing of the resin and activator.

In some cases, the effectiveness of the locking action so far exceeds th minimum specified break-away torque that it is desirable to decrease the torque. This may be accomplished by adding a mixture of salt crystals and particles of previously cured resin, such as nylon, teflon, or the like, or by substituting such particles for the crystals.

Another factor has to be taken into account in formulating the resin mixture. The method of production is carried out at room temperature, or at least with only moderate heating to accelerate reactions. This in turn requires that the resin mixture as applied have a suitable fluidity at the prevailing temperature.

It is desired to have the resin flow within a thread groove and to a limited extent along the thread groove so as to form a deposit which, within each thread groove in the band or ring, is of uniform cross-section. The addition of salt crystals, discrete particles of resin, or both, affects not only the break-away torque in a completed thread bond, but also the fluidity of the resin mixture as initially deposited.

Another factor is of course the temperature of the resin, whose fluidity or viscosity is variable in accordance with temperature. While the entire process is carried out at or about room temperature, it is contemplated that the resin mixture may be supplied at an elevated temperature which produces the desired fluidity or viscosity.

From the foregoing it will be apparent that the selection and amount of additions to the resin must be for the most part empirical.

In use, the mating threaded fastening elements are threaded together, and the interference between the deposits in the thread grooves of one element and the threads of the other ruptures and breaks up to the protective film overlying the deposit. In addition, the barrier film between the resin and activator is ruptured and broken up. The resin and activator are intermixed by the motion between opposed thread surfaces, enhanced as required by the included abrasive and/or discrete resin particles, and the resin is cured or polymerized to form a thread lock preventing undesired separation between the fastener elements.

The fastener itself is novel in the provision of a fluid unpolymerized or at least not completely polymerized resin and a fluid activator therefor selected to cause prompt polymerization thereof when mixed. This is further true because of the addition of the particulate matter, abrasive crystals such as salt or discrete solid resin particles such as nylon, teflon, or the like. These particles, in the fluid mixture of resin and activator, ensure thorough mixing, quick setting, and a controllable bonding action tailored to fit the required break-away torque range required.

Production Method

The product has been designed to provide for quantity production by fully automatic equipment.

Figure 3:
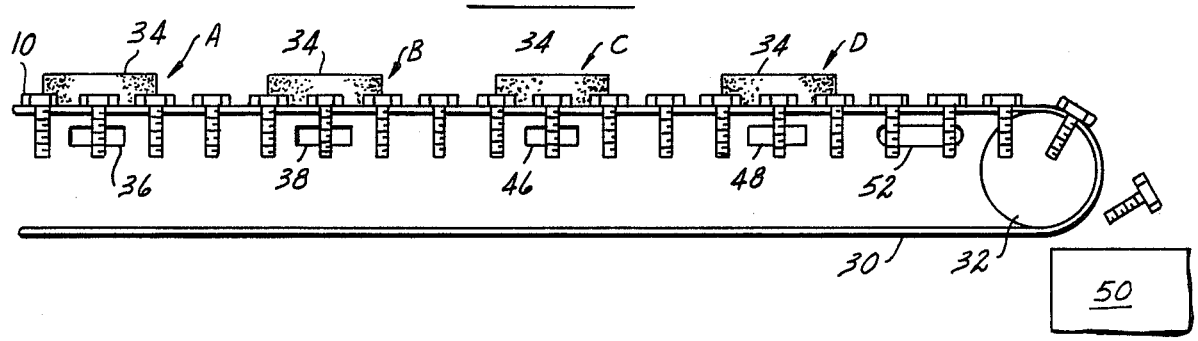
FIG. 3 is a diagrammatic view of the production line.

Referring now to FIG. 3, there is shown a production line in which a pair of spaced horizontally extending belts 30 are provided and driven by rolls, one of which is seen at 32. The headed fasteners are supported on the belts by their heads and the threaded shanks extend downwardly between the belts.

At a first station, designated generally at A, the heads of the bolts are engaged between a pair of rotating rollers, one of which is seen at 34, provided with soft resilient tires which grip the bolt heads and rotate them positively to ensure uniform treatment around the circumference of the bolt shank. The speed of rotation of the rolls is related such that the bolts traverse station A at a desired rate.

Means are provided at station A to deposit within the thread grooves 16 throughout the annular band 12 a fluid polymerizable resin, with particulate material mixed therein as desired. This deposition means is diagrammatically shown at 36, and may be in the form of a spray, an extruder or an applicator wheel operated to provide a uniform deposit 18 of the fluid resin within the thread grooves throughout the band 12.

Figure 4:
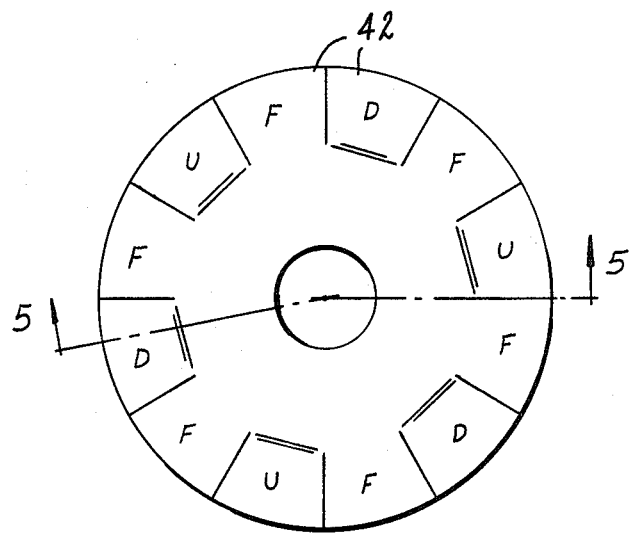
FIG. 4 is a plan view of a special spinner disk to apply activator to the previously applied epoxy resin.
Figure 5:
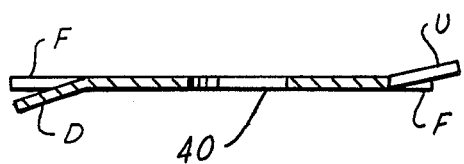
FIG. 5 is a sectional view on the line 3—3, in FIG. 2.

The fasteners are advanced to station B where a layer or ply 20 of activator or hardener for the resin is deposited uniformly to overlie the resin. The means for depositing the activator is illustrated diagrammatically in FIG. 1 at 38. Excellent results in applying this layer have been obtained by feeding the fluid activator to a disk 40, as seen in FIGS. 4 and 5. This disk is rotated about a vertical axis to fling the activator fluid centrifugally onto the resin deposit. The periphery of the disk is slotted radially and some of the resulting tangs 42 are bent upwardly as indicated at U, some are bent downwardly as indicated at D, and the rest allowed to remain flat as indicated at F. This provides a simple structure for supply the fluid activator to a band of selected width as determined by the displacement of the tangs. Disks 40 are of course contained in a housing and the fluid activator not deposited on the bolts is collected for reuse.

At station B, the fasteners are also rotated by rotating soft tired wheels or rollers 34.

The fasteners with the fluid resin deposits 18 and the activator deposits 20, are now advanced by belts 30 through station C where an aqueous solution of PVA is sprayed to completely cover the activator deposit. The spray for the PVA solution is indicated diagrammatically at 46.

In order that the entire production of the treated fasteners disclosed herein may be fully automatic and require only a relatively short production line, a fourth station D is provided, at which the powdered desiccant is applied to the PVA solution by means diagrammatically illustrated at 48. In practice, the bolt shanks at station D may be substantially enclosed to prevent loss of desiccant. Again, the fasteners are preferably rotated about their axes, as in all previous stations, by the rotating rollers 34.

The treatment of the film-forming deposit of PVA solution with the desiccant powder permits the finished fasteners to be collected at the end of the production line in containers 50. Since the fasteners may be supplied to the belts 30 by a conventional feeder, it will be apparent that the entire operation is automatic, thus providing for economical high production of the treated fasteners.

While the entire operation is essentially at room temperature, it is apparent that if required drying means such as radiant heaters indicated at 52 may be provided either beyond the desiccant supply means 52, or between this and the PVA supply means 48.

Related Applications

Attention is called to my co-pending applications, which disclose some of the features included in the present invention as follows:

Ser. No. 376,764, now U.S. Pat. No. 4,428,981, Method and Apparatus for Making Friction Locking Threaded Fasteners. This application discloses soft tired rotating wheels engageable with the heads of bolts suspended between parallel belts to provide positive rotation as thermoplastic particles are deposited in an annular zone on the threaded shanks, which are heated to a temperature to fuse the particles.

Ser. No. 379,110, Thread Lock. This application discloses the use of a desiccant powder such as guar to harden protective film from a coating of an aqueous solution of PVA over circumferentially contiguous deposits of fluid epoxy resin and a fluid activator therefor.

While the exact composition of the deposits of fluid resin and abrasive and discrete resin particles is necessarily empirical, a specific example of one such mixture is set forth below:

|  | Volume Units |
|---|---|
| Uncured fluid epoxy resin (sold by Hardman Corp. and identified by them as 13050 A) | 4000 ML |
| Common table salt crystals | 900 ML |
| Nylon particles | 100 ML |
|  | 100% |

The activator used to form a layer over the deposit of resin mixture is a tertiary amine sold by Synthron Corporation and identified by them as NX-3.

The aqueous solution of PVA is an 8–10% solution.

When applied as described to a ½" stud and cured after engaged in a threaded opening, the break-away torque is about 800–1000 in/lb.

I claim:

1. A threaded fastener provided with an annular band extending completely around the threaded portion of said fastener and encompassing several adjacent threaded convolutions, a uniform deposit extending completely around each thread valley convolution within said band, said deposit comprising at the bottom of each thread groove a fluid polymerizable resin and a fluid layer of a polymerizing activator for said resin overlying said resin, the deposit of polymerizable fluid resin and fluid activator together substantially filing the thread groove, but received wholly within the thread groove, a barrier film at the confronting surfaces of said resin and activator composed of fully polymerized resin effective to prevent further polymerization of said resin while said film is intact, and a strong, thin, non-tacky protective film overlying said deposit.

2. A fastener as defined in claim 1, in which said resin is epoxy.

3. A fastener as defined in claim 1, said deposit having therein a multiplicity of abrasive particles effective when said fastener is engaged with a mating fastener to scour the fluid resin from the thread surfaces and to insure complete mixing of the resin and activator.

4. A fastener as defined in claim 3, in which said particles comprise crystals of common table salt.

5. A fastener as defined in claim 1, in which said protective film is PVA.

6. A fastener as defined in claim 5, in which said protective film has incorporated therein a multiplicity of particles of guar.

7. A fastener as defined in claim 6, in which the guar particles in said protective coat cause said protective coat to have a rough irregular exterior surface.

8. A fastener as defined in claim 3, in which said fastener is a stud or bolt.

* * * * *